Feb. 21, 1928.
F. G. NEAL
TIRE BUILDING APPARATUS
Filed Feb. 19, 1924    2 Sheets-Sheet 1
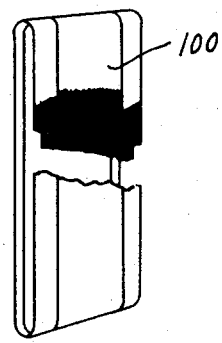
Fig.1.
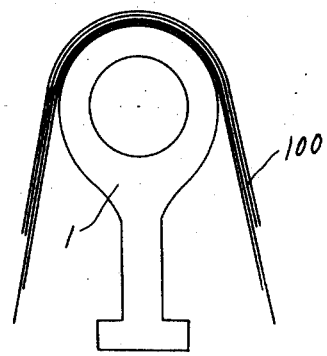
Fig.3.
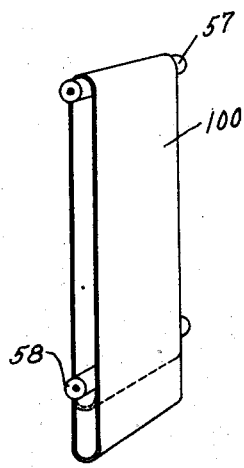
Fig.2.
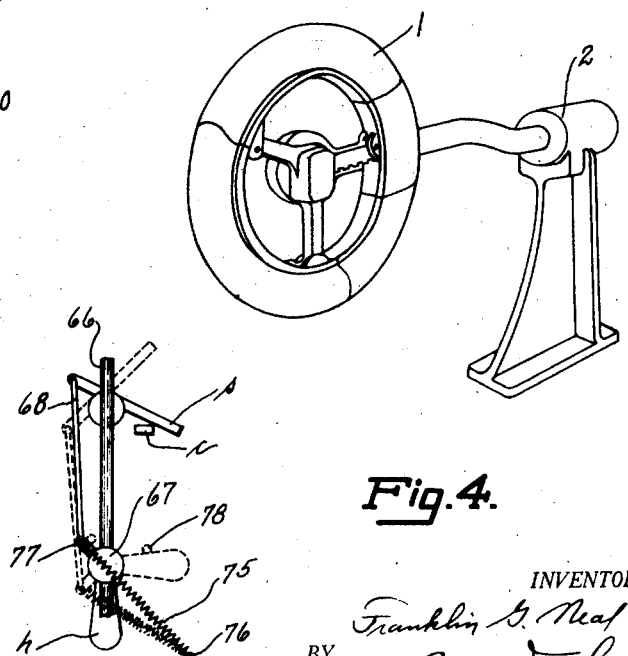
Fig.4.
Fig.13.
INVENTOR.
Franklin G. Neal
BY Edward C. Taylor
ATTORNEY.

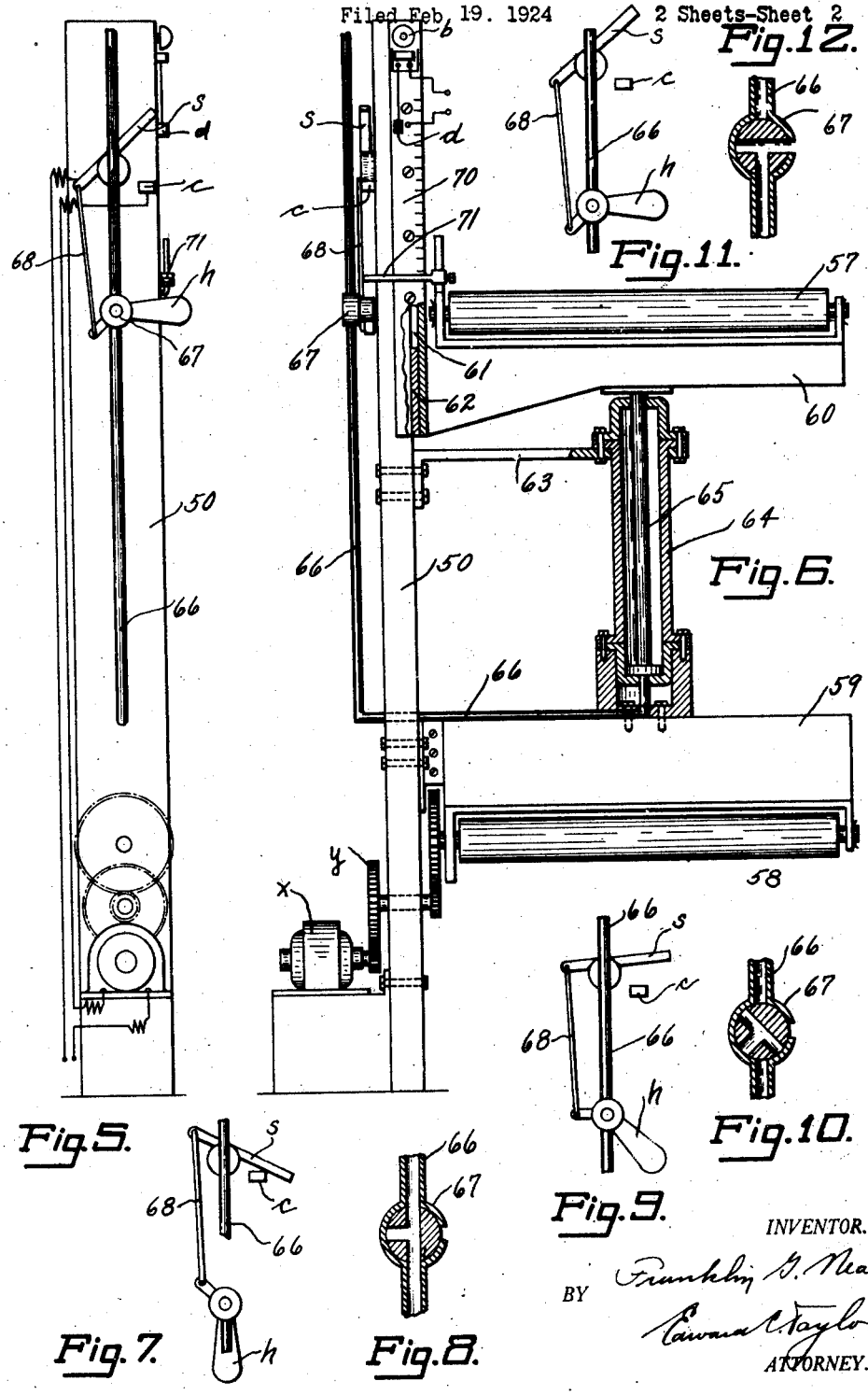

Patented Feb. 21, 1928.

1,659,635

UNITED STATES PATENT OFFICE.

FRANKLIN G. NEAL, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

TIRE-BUILDING APPARATUS.

Application filed February 19, 1924. Serial No. 693,937.

The invention herein disclosed is a species of the generic invention disclosed in my copending application Serial No. 597,260, filed October 27, 1922. In the prosecution of the latter case, division between different species of the invention was required, and the present case is such division. This invention, however, is intended to be sufficiently disclosed to stand alone or as a continuation in part of the parent case with respect to its principal features.

The apparatus shown in the drawings is particularly planned to aid the building of cord automobile tires. It is customary to build the tire casing on a former or mandrel by stretching endless bands of laminated rubberized cords arranged on the bias with the bias angles in different plies reversed to give strength in different directions. The cords thus arranged are herein called fabric and this term is used in its general as well as specific sense. The cords are the strain-resisting members of the tire and when rubberized in the making steps are held in sheet form as if laid in a matrix sheet of unvulcanized rubber. Such sheets are laminated and built into multi-ply bands which are stretched to a substantial degree when applied to the tire mandrel and then shaped on the mandrel to tire form.

My invention is directed to an apparatus or device for quickly stretching the multi-ply bands and conditioning them in an improved manner for their application to the tire mandrel during the tire building operations. The means by which this purpose is accomplished is characterized by its convenient mode of operation as well as by the fact that a proper operation of stretching the tire building band is insured. Its automatic features are important in taking away from the decision of the personal tire builder the character of stretch to be given to the band.

In the drawings,

Fig. 1 is a perspective view with a part broken away, of a four-ply cord fabric band adapted to be stretched, by the apparatus of the invention, shortly before it is applied to a tire mandrel in the building operation.

Fig. 2 is a perspective view, somewhat diagrammatic, illustrating the band of Fig. 1 as stretched from one condition to another.

Fig. 3 is a sectional view through the tire mandrel after the four-ply band of Fig. 1 has been stretched and applied thereto, but before any stitching or rolling down operations have been done on it.

Fig. 4 is a perspective view of a well known type of tire building stand in common use, and upon which the bands after being stretched can be built into a tire.

Fig. 5 is a rear view of the stretcher for the tire building band.

Fig. 6 is a side elevation of the stretcher with parts shown in section and parts broken away to show certain details of construction.

Fig. 7 is a detail view of the air valve operating means.

Fig. 8 is a sectional detail of the air valve in position corresponding to the position of the parts shown in Fig. 7.

Figs. 9 and 10 correspond to Figs. 7 and 8 but with the parts in a different position.

Figs. 11 and 12 correspond to Figs. 7 and 8 but with the parts in a still different position.

Fig. 13 is a slight modification of the air valve operating means whereby the valve ports are automatically turned from the position of Fig. 8 to that of Fig. 12.

Before describing the stretcher mechanism, I shall refer briefly to the tire building operation which gives the environment under which the mechanism works.

The band 100 is stretched from the condition of Fig. 1 to that of Fig. 2. The operator can then readily take the band off the stretcher, apply it over the crown of the core or mandrel 1, and roll the loose skirts in place with a hand roller, or machine rollers may be used if desired. The band will not shrink a substantial amount during the short time interval required for the transfer from the stretcher to the mandrel. And yet the band has retained its elasticity due to the quick acting nature of my mechanism which stretches it fast enough to prevent its setting in stretched condition. The degree of stretch given the band may, and preferably is, from the unstretched tire bead circumference to the tire crown or mandrel circumference. After application to the mandrel the band continues to shrink until it automatically takes the position shown in Fig. 3. The operator continues to apply the endless bands as stretched to the core 1 on building stand 2, building the complete carcass with the beads therein on the latter in any suitable manner.

The stretcher mechanism has for its purpose, therefore, the work of stretching the multi-ply band for its proper application to the tire building form, whatever that specific form may be.

Figs. 5 to 13 disclose the particular modification of the invention forming the basis for the claims herein. This modification in many respects is quite different from the modifications claimed specifically in the parent application. Referring to Figs. 5 and 6, a rigid vertical support 50 is arranged to carry a yoke 59 fixed against movement on the support 50, and a yoke 60 arranged to move vertically in suitable ways 61 provided by the inturned metal straps 70—one fastened to each side of the support 50 and with an in-turned end, spaced from and parallel to the front face of the support 50 to, receive outwardly turned flanges 62 of the yoke 60, whereby the latter is supported and guided for the desired movement.

A positively driven roller 58 is mounted in the yoke 59 and is driven from the motor $x$ by means of the gear connections $y$ shown. The yoke 60 is supported on a piston rod 65, extending from the cylinder 64 suitably supported on the yoke 59 between it and yoke 60. The upper end of this cylinder is further supported against movement by a bracket 63 extending out from the front face of the support 50. The yoke 60 further supports, as indicated, the roller 57 which in this instance is an idler. The pipe 66 leading from a source of fluid pressure—air, for example—terminates in the cylinder 64 under the piston of the rod 65. A three-way valve 67 (Fig. 8) in pipe 66 when turned to the position of that figure, will admit air under pressure, to raise the piston and thus its rod 65 in the cylinder 64, thus to raise the yoke 60 and its roller 57. When the valve is turned to the position of Fig. 10, the yoke 60 will be yieldingly held at the desired elevated position. When the valve is moved to the position of Fig. 12, the air within cylinder 64 is exhausted as shown and the yoke 60 with its supporting piston rod 65 is automatically lowered by the weight of the parts so as to return to its original position.

Valve 67 is turned to its various positions by the handle $h$ which has an extension beyond the valve as indicated in Fig. 11. To this extension is fastened a connecting rod 68 which in turn is fastened to one end of a suitably pivoted switch $s$. When the pivoted switch $s$ is brought into contact with the terminal $c$ the circuit to motor $x$ is closed to draw upon the power whereby roll 58 is turned.

It will be seen from Fig. 7 that as the valve 67 is turned to apply power to raise yoke 60, the switch $s$ is thereby brought into contact with the terminal $c$ so as to start the motor which rotates roller 58 but only while valve 67 is in position for raising the yoke 60. A vertically adjustable horizontal bar 71 of metal, carried by the yoke 60, extends across the side face of the support 50, and has a direct metallic contact (or connection by a metal spring) with the metal strap 70 as the yoke 60 is raised and lowered. The metal strap 70 is conveniently provided with a scale as indicated, so that the operator may very readily determine the scope of the operations. This metallic bar 71 is in line with an extension of the switch $s$ and since the bar 71 is adjustable it will be readily seen that it can open switch $s$ (as indicated in Fig. 9) to stop the motor $x$ and through the connection of the switch with handle $h$, turn the valve 67 to thereby stop the elevating operation of the piston 65. In this operation the valve 67 turns from the position shown in Fig. 8 to that shown in Fig. 10. In addition the bar 71 at the time it opens switch $s$ contacts with terminal $d$ of a circuit including the bell $b$ and the metal strap 70. This circuit with the bell in it causes a signal to be given indicating that the yoke 60 has been elevated to the desired degree determined by the adjustment of the bar 71 carried by the yoke 60.

It is apparent that the automatic operation of the valve 67 from the position shown in Fig. 8 to that shown in Fig. 10 may be extended so as to move the valve instead to the position shown in Fig. 12. If the operator is ready in each instance to take the band off the stretcher and apply it to the mandrel in a reasonable time, the automatic operation of the valve from its two extreme positions may be desirable. On the other hand, it may be desirable to hold the band stretched until it is removed from the apparatus, which is accomplished when the valve is in the position of Fig. 10. From this position the operator may turn the valve to the position of Fig. 12 by hand, which should be done before the band has had time to set in its stretched condition and thereby lose its power to shrink on the form as desired. The signal bell is an aid to this feature. The particular mode of operation depends upon conditions. The means of obtaining either one or the other mode of operation is apparent. For example, the ports may be changed in Fig. 10 so that this figure would then show the exhausting position of the valve instead of Fig. 12. I have shown other means in Fig. 13, whereby a tension spring 75 with one end at any fixed point 76 pulls along the line of the valve axis in the position of Fig. 7 but turns the valve 90° as soon as switch $s$ is moved so that the spring pull is from point 76 to point 77 on a line below the valve axis.

Stop 78 is provided to limit the valve movement.

As previously stated, when valve 67 is turned from the position of Fig. 8 to that of Fig. 12 the cylinder 64 is then open to the atmosphere so that the parts are automatically lowered to their original position shown in Fig. 6.

The drawings indicate the diameter of the rollers 57 and 58, the thickness of the yokes supporting the rollers, and the dimensions and location of the air cylinder with respect to the band or pocket to be stretched on the rollers. It will be noted that the stretching devices, in this case the rollers, engage a very small portion of the band relatively to its length and therefore they do not appreciably retard the transverse shrinkage of the band as it is stretched. And the shifting of the band on the rollers of such small size acts to distribute the stretching forces in an ideal way. The front part of the apparatus presents an open arrangement permitting the band to be telescoped onto the two rollers. The rollers suspend the band with entire freedom between them, for the yokes and the cylinder between the yokes are small enough to avoid any contact whatever with the band, unless the operator presses the band inwardly by hand while it is being stretched. The presence of the yokes 59 and 60 in addition to the cylinder 64 and its piston between the vertical flights of the band while it is being stretched, is an advantage. The operator will not be tempted to "belly" in the band being stretched, by pressing his hands against the sides, because then the band will contact with cylinder 64, and this the operator knows is undesirable. Furthermore the vertical arrangement of the stretcher saves floor space, makes for the most convenient positioning of the apparatus for the builder, but most important holds the band suspended before, during, and after, the stretching operations so that the material which is sticky will not come in contact at the different portions.

The operation of this device is as follows:

An unstretched band 100 is placed over rollers 57 and 58. The valve handle $h$ is then turned to the position of Fig. 8 to admit air to the cylinder 64 and at same time close the circuit to motor $x$, whereby roller 58 is driven rapidly enough to move the band 100 over each of the rollers 57 and 58, whereby the lines of contact with the rollers are constantly changed. At the same time, the yoke 60 is being steadily elevated at a desired speed determined by the design of the parts and the air pressure used. When the band has been stretched by this action to the desired degree indicated in the adjustment of the bar 71 on yoke 60, the switch $s$ is automatically opened, the valve handle $h$ is automatically turned to the position of Fig. 9 or Fig. 11 to stop the elevating operation, the parts automatically return to their original position if the arrangement of Fig. 13 is used, the bell $b$ signals that the band has been stretched, and the operator, who may be doing other work for the short interval of time required for the stretching operation, takes the band and applies it to his building form. The specific arrangement shown in Fig. 13 was not disclosed in the aforesaid parent application, but the automatic features with their essential characteristics are therein described.

The advantage of this apparatus, in addition to its automatic and power operated feautres, is found in the fact that the band 100 has even less contact with the rollers (since there are only two of them) than it has when stretched on the four rollers found in the other modifications of the invention shown in the parent application previously referred to. But in the present embodiment, as in the other modifications, as the band is suspended between the rollers, it is preferably kept flat in cross-section during the operation and the points of contact with the rollers are kept changing before the rollers have an opportunity to retard the shrinking action in the width of the pocket as it is being longitudinally stretched. It is thus seen that the work desired is performed in many respects similarly to the way in which the work is done by said other modifications. The stretcher apparatus is quick acting, by which I mean that the band is stretched and may be released before the unvulcanized rubber sets and loses its elasticity, whereby the operation of shrinking the band on the tire former as indicated in Fig. 3 would not be helped. In addition the advantageous effects desired by the construction of the apparatus in all modifications on account of the small amount and character of contact between the stretching rollers and the band as it is being stretched, is to some degree increased by the construction shown in the modification of this case.

It will be clear to anyone skilled in the art that various other modifications embodying some or all of the new and useful improvements can be constructed specifically unlike those shown. For example, when I say that the band is preferably kept flat in cross-section during the stretching operation I refer to what I consider the best position for the work, but I do not intend to exclude a reasonable degree of curvature such as may be obtained by crowning rolls 57 and 58. The desirable thing which I want to emphasize is that the edge portions as well as the central portion of the band are substantially stretched in the operation of the device. This effect can still be attained even though rolls 57 and 58 are crowned to a noticeable extent.

The invention is particularly pointed out and claimed as follows:

What I claim is:

1. A machine for stretching an elastic carcass band in endless form for tire building, comprising a stretching frame having two relatively spaced band engaging rollers mounted in the frame and free to receive a band edgewise and hold it suspended out of frictional contact with the machine, and quick-acting power applying means operable independently of the band's resistance to move one of said rollers far enough from the other for stretching the band to a tire tread length before the band has time to set and while the band is free to move over the rollers.

2. A machine for stretching an elastic carcass band in endless form for tire building, comprising a stretching frame having two band engaging rollers, one mounted over the other in the frame and mounted so as to permit the quick, telescopic application and removal of the band; quick-acting means to move one of said rollers away from and toward the other to avoid the loss of elasticity in the stretching and releasing operations; said rollers being positioned in the frame so as to hold the band out of all contact with the frame except the contact with the rollers.

3. A machine for stretching an elastic carcass band in endless form for tire building, comprising a stretching frame having two band engaging rollers, one mounted over the other in the frame and mounted so as to permit the quick, telescopic application and removal of the band; quick-acting means to move one of said rollers away from and toward the other to avoid the loss of elasticity in the stretching and releasing operations; said rollers being positioned in the frame so as to hold the band out of all contact with the frame except the contact with the rollers; and power means to drive one of said rollers.

4. A machine for stretching an elastic carcass band in endless form for tire building, comprising a stretching frame having two band engaging rollers, forming the sole means of supporting contact for the band during its stretching operations, said rollers being mounted in the frame so as to permit quick, telescopic application and removal of the band; quick-acting power means to move the rollers for the stretching operation to avoid the loss of elasticity, means to rotate one of the rollers during the stretching operation, all constructed and arranged for the band to be applied to the supporting means, stretched solely under rolling contact and released for use while still in uniform shrinking condition.

5. In a tire building apparatus, a pair of spaced rollers adapted to support a band of tire building material, means to separate the rollers to stretch the band, automatic means to stop the separation of the rollers after the band has been stretched a predetermined amount, and means to signal the operator when such stretching is completed.

FRANKLIN G. NEAL.